(12) United States Patent
Cetin et al.

(10) Patent No.: US 8,432,451 B2
(45) Date of Patent: Apr. 30, 2013

(54) METHOD, DEVICE AND SYSTEM FOR DETERMINING THE PRESENCE OF VOLATILE ORGANIC COMPOUNDS (VOC) IN VIDEO

(75) Inventors: Ahmet Enis Cetin, Ankara (TR); Behcet Ugur Toreyin, Ankara (TR)

(73) Assignee: Delacom Detection Systems LLC, Sarasota, FL (US)

( * ) Notice: Subject to any disclaimer, the term of this patent is extended or adjusted under 35 U.S.C. 154(b) by 1062 days.

(21) Appl. No.: 12/418,238

(22) Filed: Apr. 3, 2009

(65) Prior Publication Data

US 2009/0290025 A1 Nov. 26, 2009

Related U.S. Application Data (60) Provisional application No. 61/042,155, filed on Apr. 3, 2008.

(51) Int. Cl.
*H04N 5/33* (2006.01)
*H04N 5/225* (2006.01)

(52) U.S. Cl.
USPC .......................................... 348/164; 348/170

(58) Field of Classification Search ................ 348/146
See application file for complete search history.

(56) References Cited

U.S. PATENT DOCUMENTS

| | | | | |
|---|---|---|---|---|
| 2002/0106125 | A1* | 8/2002 | Queiroz | 382/191 |
| 2003/0012696 | A1* | 1/2003 | Millancourt | 422/83 |
| 2008/0063298 | A1* | 3/2008 | Zhou et al. | 382/280 |
| 2009/0123074 | A1* | 5/2009 | Chen et al. | 382/190 |
| 2009/0161915 | A1* | 6/2009 | Chen et al. | 382/107 |
| 2009/0239252 | A1* | 9/2009 | Trevejo et al. | 435/29 |

* cited by examiner

*Primary Examiner* — Thu Nguyen
*Assistant Examiner* — Joseph Greene
(74) *Attorney, Agent, or Firm* — Whitman, Curtis, Christofferson & Cook, P.C.

(57) ABSTRACT

A video based method to detect volatile organic compounds (VOC) leaking out of components used in chemical processes in petrochemical refineries. Leaking VOC plume from a damaged component causes edges present in image frames to loose their sharpness, leading to a decrease in the high frequency content of the image. Analysis of image sequence frequency data from visible and infrared cameras enable detection of VOC plumes in real-time. Analysis techniques using adaptive background subtraction, sub-band analysis, threshold adaptation, and Markov modeling are described.

14 Claims, 5 Drawing Sheets

METHOD, DEVICE AND SYSTEM FOR DETERMINING THE PRESENCE OF VOLATILE ORGANIC COMPOUNDS (VOC) IN VIDEO

This application claims priority from U.S. Provisional Patent Application No. 61/042,155 titled "Volatile Organic Compound Plume Detection Using Wavelet Analysis of Video" filed on Apr. 3, 2008.

BACKGROUND OF THE INVENTION

1. Field of the Invention

The present invention generally relates to the prophylactic detection of impending chemical volatility, and in particular to use of imaging techniques to detect the presence of volatile organic compounds outside a containment system.

2. Background Description

Petroleum refineries and organic chemical manufacturers periodically inspect leaks of volatile organic compounds (VOC) from equipment components such as valves, pumps, compressors, flanges, connectors, pump seals, etc. as described in L. Zhou, and Y. Zeng, "Automatic alignment of infrared video frames for equipment leak detection," Analytica Chimica Acta, Elsevier, v. 584/1, pp. 223-227, 2007. Common practice for inspection is to utilize a portable flame ionization detector (FID) sniffing the seal around the components for possible leaks, as indicated by the U.S. Environmental Protection Agency in "Protocol for Equipment Leak Emission Estimates," EPA-453/R-95-017, November 1995. A single facility typically has hundreds of thousands of such components.

FIDs are broadly used for detection of leakage of volatile organic compounds (VOC) in various equipment installed at oil refineries and factories of organic chemicals. For example, U.S. Pat. No. 5,445,795 filed on Nov. 17, 1993 describes "Volatile organic compound sensing devices" used by the United States Army. Another invention by the same inventor, U.S. Patent Application No. 2005/286927, describes a "Volatile organic compound detector." However, FID based monitoring approaches turns out to be tedious work with high labor costs even if the tests are carried out on as limited a frequency as quarterly.

Several optical imaging based methods are proposed in the literature for VOC leak detection as a cost-effective alternative, as described in ENVIRON, 2004: "Development of Emissions Factors and/or Correlation Equations for Gas Leak Detection, and the Development of an EPA Protocol for the Use of a Gas-imaging Device as an Alternative or Supplement to Current Leak Detection and Evaluation Methods," Final Rep. Texas Council on Env. Tech. and the Texas Comm. on Env. Quality, October, 2004, and M. Lev-On, H. Taback, D. Epperson, J. Siegell, L. Gilmer, and K. Ritterf, "Methods for quantification of mass emissions from leaking process equipment when using optical imaging for leak detection," Environmental Progress, Wiley, v. 25/1, pp. 49-55, 2006. In these approaches, infra-red (IR) cameras operating at a predetermined wavelength band with strong VOC absorptions are used for leak detection.

In other contexts it has been shown that fast Fourier transforms can be used to detect the peaks inside a frequency domain. For example, in the video-based fire detection system developed by Fastcom, temporal fast Fourier transforms were computed for the boundary pixels of objects, as described in R. T. Collins, A. J. Lipton, T. Kanade, H. Fujiyoshi, D. Duggins, Y. Tsin, D. Tolliver, N. Enomoto, O. Hasegawa, P. Burt, and L. Wixson, "A System for Video Surveillance and Monitoring: VSAM Final Report," Tech. report CMU-RI-TR-00-12, Carnegie Mellon University, 2000. In a similar system developed by Liu and Ahuja, shapes of fire in the video were also represented within frequency domain, as described in B. U. Toreyin, A. E. Cetin, A. Aksay, and M. B. Akhan, "Moving Object Detection in Wavelet Compressed Video," Elsevier, Signal Processing: Image Communication, EURASIP, vol. 20, pp. 255-264, 2005 (hereafter "Signal Processing 2005"). Since Fourier transforms don't contain temporal information, these transforms should be performed inside previously established time frames. Within these time frames, length of the time frame plays a vital role. If length of the time frame is too long, not too many peaks may be obtained in fast Fourier transform data. If length of the time frame is not long enough, then no peaks may be obtained in fast Fourier transform data. However, VOC plumes exhibit variations over time that are random rather than according to a purely sinusoidal frequency. This means that Fourier domain methods are difficult to apply to VOC plume detection.

Volatile organic compounds are typically stored in containers and piped through systems using valves, connectors, pump joints, and similar equipment. While this equipment is designed so that the VOC remains contained within the system, there is potential for leakage at these valves, connectors, pump joints and the like. To detect leakage a detector is positioned in the vicinity of such equipment. At these locations, the detector makes separate measurements at each piece of equipment to determine whether or not there is a VOC plume. In the prior art gas leakage in the form of VOC plumes is detected using methods like gas chromatography, as described in Japanese Patent No. JP2006194776 for "Gas Chromotograph System and VOC Measuring Apparatus Using it" to Y. Tarihi, or oxidation as described in Patent No. WO2006087683 for "Breath Test for Total Organic Carbon". However, these processes cause loss of time, effort and money at places, such as oil refineries, where there are many pieces of equipment that are likely to incur leakage.

Therefore there is a need for a VOC plume detection technology that is not constrained by the foregoing limitations of the prior art.

SUMMARY OF THE INVENTION

The present invention is a VOC plume detection method and system based on wavelet analysis of video. A system using the invention provides a cost effective alternative to flame ionization detectors which are currently in use to detect VOC leakages from damaged equipment components in petrochemical refineries. The method of the invention processes sequences of image frames ("video image data") captured by visible-range and/or infrared cameras.

Several embodiments of the invention are described herein. One embodiment uses an adaptive background subtraction method to obtain a wavelet domain background image of the monitored scene, then uses a sub-band analysis for VOC plume detection, and optionally applies a threshold adaptation scheme. Another embodiment applies Markov modeling techniques to the intensity component of the raw picture data.

The invention discloses a method and system for determining the presence of volatile organic compounds (VOC) using video image data to detect a drop in temperature at a leakage site using wavelet analysis of the video image data. Moving regions in a current video image are detected, and then it is determined whether the detected moving region has decreased wavelet energy. In one aspect, the invention provides for detecting moving regions by subtracting the current video image from an estimated background image.

In another aspect, the invention determines that a detected moving region has decreased wavelet energy by determining an average energy $E_{Rs}$ of the detected moving region in the current video image, determining an average energy $E_{Ro}$ of a corresponding region in an original image, and determining that the average energy difference $|E_{Rs}-ER_o|$ is less than a threshold value. The threshold value is adaptively estimated to account for various VOC types and changes in lighting conditions.

A further aspect of the invention determines decreased wavelet energy of a detected moving region by detecting low sub-band image edges using a wavelet transform, using a three-state hidden Markov model to determine flicker for the detected moving region by analyzing an intensity channel in LL sub-band images, and selecting for the detected moving region a model having the highest value of probability of transition between states of VOC and non-VOC Markov models. Additionally, the invention provides for estimating contour and center of gravity of a detected moving region, computing a one-dimensional signal for a distance between the contour and center of gravity of the detected moving region, and determining a frequency of the distance signal.

In a further aspect of the invention, the video image data is captured from stationary visible and infrared cameras, and the video image data is transformed into wavelet domain. Another aspect of the invention is determining that a detected moving region is a region containing VOC by combining weighted determinations from respective processing of the video image data from the respective visual and infrared cameras. The weighted determinations may be combined using a voting method, for example the "T-out-of-v" voting method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED

Embodiments of the Invention

The present invention is an innovative device and system developed for detecting plumes of volatile organic compounds (VOC) in a plurality of images captured using both visible and infrared cameras.

There are different types of fugitive VOC emissions with varying plume characteristics. For example, diesel and propane have vapor similar to smoke coming out of a pile of burning wood whereas gasoline vapor is transparent and wavy. This results in visible, smoke like semi-transparent flickering plumes for propane and diesel. What is common in these VOC types is that the temperature of the VOC plume emitted from a leaking component drops during the initial expansion, as described in L. Zhou, and Y. Zeng, "Automatic alignment of infrared video frames for equipment leak detection," *Analytica Chimica Acta*, Elsevier, v. 584/1, pp. 223-227, 2007. This causes a temperature difference between the VOC plume and the surrounding air. For gasoline, this temperature difference generates a fluctuation in the refractive index of the surrounding air causing blur and a net radiation difference by the gas absorption which can be observed with visible-range cameras.

Independent of the VOC type, plumes emitted from leaking components soften the edges in image frames. This characteristic property of VOC plumes is a good indicator of their existence in the range of the camera. It is well known that edges produce local extrema in wavelet subimages, as described in A. E. Cetin and R. Ansari, "Signal recovery from wavelet transform maxima," IEEE Trans. on Signal Processing, v. 42, pp. 194-196, 1994, and S. Mallat, and S. Zhong, "Characterization of Signals from Multiscale Edges," IEEE Trans. on PAMI, v. 14/7, pp. 710-732, July 1992. Degradation of sharpness in the edges results in a decrease in the values of these extrema. However, these extrema values corresponding to edges do not completely disappear when there is VOC plume in the scene. In fact, they simply loose some of their strength but they still stay in their original locations, occluded partially by the (semi-) transparent plume. Therefore a decrease in wavelet extrema values or wavelet domain energy is an indicator of VOC plumes in the monitored area.

Figure 1:
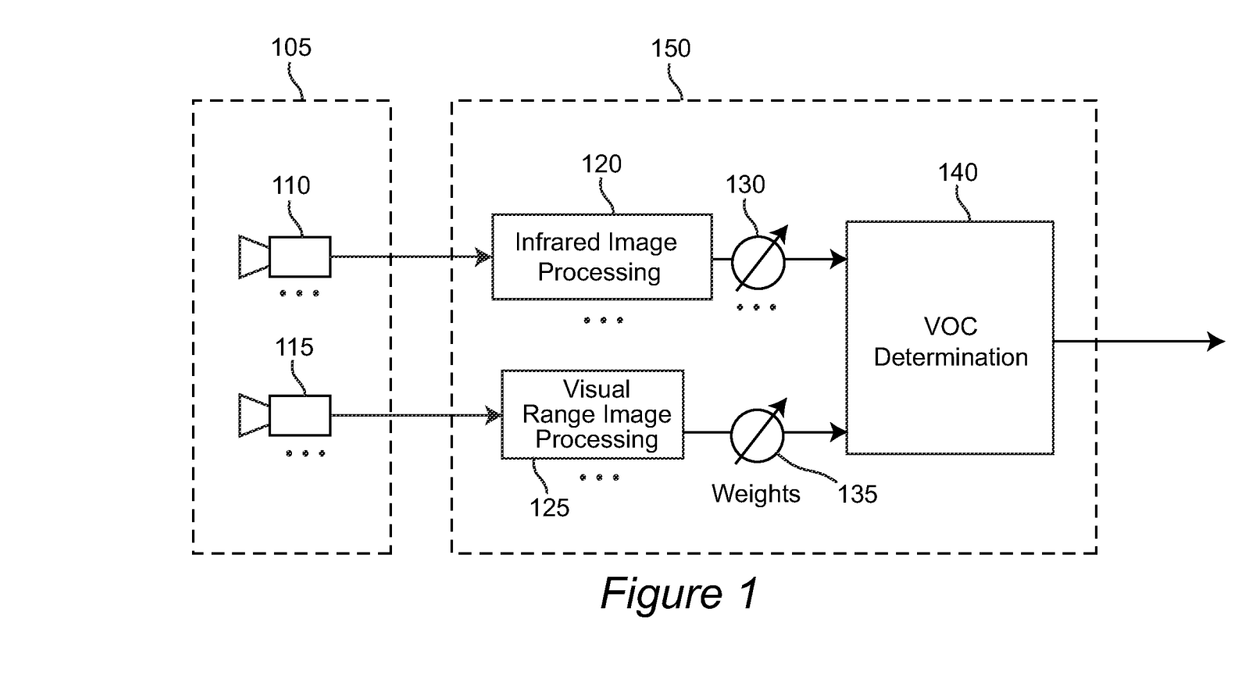
FIG. 1 is a schematic showing operation of the invention.

Referring now to the drawings, and more particularly to FIG. 1, there is shown in schematic form operation of a VOC detection device in accordance with the invention. Infrared camera 110 generates a plurality of images, which are analyzed 120 as hereafter provided and given weight 130. Similarly, visible range camera 115 generates a plurality of images, which are analyzed 125 as hereafter provided and given weight 135. The weighted imaging results from both the infrared and the visible cameras are used to make a determination 140 whether or not VOC is present at a location corresponding to the images. The invention may be configured with a plurality of sensors 105, and implementation on a computer 150 will typically provide for multiple instances of VOC analysis (120,125) and weighting (130,135). Determinations 140 will be applied to possible VOC detections at multiple physical locations covered by the images generated by the cameras (110,115).

Adaptive Plume Detection

The first step in this embodiment of the VOC plume detection method is to detect changing regions in video. Background subtraction is a standard method for moving object detection in video. The current image of the video is subtracted from the estimated background image for segmenting out objects of interest in a scene. We use a particular method based on recursive background estimation in the wavelet domain to get an estimate of the background image, but other background estimation methods also can be used without loss of generality.

Let $I_n(k,l)$ represent the intensity (brightness) value at pixel position $(k,l)$ in the nth frame. Estimated background intensity value at the same pixel position, $B_{n+1}(k,l)$ is calculated as follows:

$$B_{n+1}(k, l) = \begin{cases} aB_n(k, l) + (1-a)I_n(k, l) \text{ non-moving} \\ B_n(k, l), (k, l) \text{ moving} \end{cases} \quad (1)$$

where $B_n(k,l)$ is the previous estimate of the background intensity value at the same pixel position. Initially, $B_0(k,l)$ is set to the first image frame $I_0(k,l)$. The update parameter a is a positive real number where $0<\alpha<1$. A pixel positioned at $(k,l)$ is assumed to be moving if the brightness values corresponding to it in image frame $I_n$ and image frame $I_{n-1}$ satisfy the following inequality:

$$|I_n(k,l) - I_{n-1}(k,l)| > T_n(k,l) \quad (2)$$

where $I_{n-1}(k,l)$ is the brightness value at pixel position $(k,l)$ in the $(n-1)$-st frame $I_{n-1}$, and $T_n(k,l)$ is a threshold describing a statistically significant brightness change at pixel position $(k,l)$. This threshold is recursively updated for each pixel as follows:

$$T_{n+1}(k, l) = \quad (3)$$
$$\begin{cases} aT_n(k, l) + (1-a)(c \, |I_n(k, l) - B_n(k, l)|), (k, l)) \text{ non-moving} \\ T_n(k, l), \text{ moving} \end{cases}$$

where $c>1$ and $0<\alpha<1$. Initial threshold values are set to an empirically determined value.

The wavelet transform of the background scene can be estimated from the wavelet coefficients of past image frames, as is known in the art. When there is no moving object in the scene, the wavelet transform of the background image is stationary as well. On the other hand, foreground objects and their wavelet coefficients change in time. Therefore equations (1)-(3) also can be implemented in the wavelet domain to estimate the wavelet transform of the background image, which is also known in the art. Let $D_n$ represent any one of the sub-band images of the background image $B_n$ at time instant n: The sub-band image of the background $D_{+1}$ at time instant $n+1$ is estimated from $D_n$ as follows:

$$D_{n+}(i, j) = \begin{cases} aD_n(i, j) + (1-a)J_n(i, j), (i, j) \text{ non-moving} \\ D_n(i, j), \text{ moving} \end{cases} \quad (4)$$

where $J_n$ is the corresponding sub-band image of the current observed image frame $I_n$. When the viewing range of the camera is observed for a while, the wavelet transform of the entire background can be estimated because moving regions and objects occupy only some parts of the scene in a typical image of a video and they disappear over time. Non-stationary wavelet coefficients over time correspond to the foreground of the scene and they contain motion information. In the VOC plume detection algorithm, $D_n$ is estimated for the first level LL (low-low), HL (high-low), LH and HH sub-band images. These estimated background sub-band images are used in the sub-band based plume detection step described below.

The estimated sub-band image of the background is subtracted from the corresponding sub-band image of the current image to detect the moving wavelet coefficients and consequently moving objects, as it is assumed that the regions different from the background are the moving regions. In other words, all of the wavelet coefficients satisfying the inequality $$|J_n(i,j) - D_n(i,j)| > T_n(i,j) \quad 5$$

are determined to be moving regions.

The next step in this embodiment is plume detection. As discussed above, fugitive VOC plumes soften the edges in image frames independent of the VOC type. It is necessary to analyze detected moving regions further to determine if the motion is due to plume or an ordinary moving object. Wavelet transform provides a convenient means of estimating blur in a given region because edges in the original image produce high amplitude wavelet coefficients and extrema in the wavelet domain. When there is plume in a region wavelet extrema decrease. Therefore, (i) local wavelet energy decreases and (ii) individual wavelet coefficients corresponding to edges of objects in background whose values decrease over time should be determined to detect plume.

Let $J_{n,LH}$, $J_{n,HL}$ and $J_{n,HH}$ represent the horizontal, vertical and detail sub-bands of a single stage wavelet transform of the n-th image frame $I_n$, respectively. An indicator of the high frequency content of $I_n$ is estimated by $$E_h(I_n) = \sum_{i,j} |J_{n,LH}| + \sum_{i,j} |J_{n,HL}| + \sum |J_{n,HH}| \quad (6)$$

The discrete-time wavelet domain energy measure E(I) can be computed using the Euclidian norm as well. However, the absolute value based L1 norm used in equation (6) is computationally more efficient because it does not require any multiplications. Similarly for the background image $B_n$:

$$E_h(B_n) = \sum_{i,j} |D_{n,LH}| + \sum_{i,j} |D_{n,HL}| + \sum |D_{n,HH}| \quad (7)$$

The following inequality provides a condition for the existence of VOC plumes in the viewing range of the camera:

$$\Delta_1(n) = \frac{E_h(I_n)}{E_h(B_n)} < T_1 \quad (8)$$

where the threshold $T_1$ satisfies $0<T_1<1$.

Candidate plume regions are determined by taking the intersection of moving regions and the regions in which a decrease in local wavelet energies occur according to equation (8). These candidate regions are further analyzed in low-low (LL) sub-band images. Most of the energy of the plume regions in image frames is concentrated in low-low (LL) sub-band. Hence, the difference between the average energies of plume regions in the current frame and its corresponding LL sub-band image is expected to be close to zero.

Let a single stage wavelet transform be used for sub-band analysis. Let a candidate plume region, $R_S$, be determined in LL sub-band image, $J_{n,LL}$ according to equations (5) and (8). Average energy of $R_S$ is given as $$E_{Rs,n} = \frac{1}{4N} \sum_{(i,j) \in Rs} |J_{nLL}(i, j)|^2 \quad (9)$$

where N is the total number of pixels in $R_S$. Average energy of the corresponding region, $R_O$ in the original image $I_n$ is $$E_{Ro,n} = \frac{1}{4N} \sum_{(k,l) \in Ro} |I_n(k,l)|^2 \qquad (10)$$

Since the LL image is a quarter size of the original image, one needs to use a scaling factor of 4 to calculate the average energy of a pixel in equation (10). The candidate regions for which the difference between average energies is small are determined as plume regions:

$$\Delta_2(n) = |E_{Rs,n} - E_{Ro,n}| < T_2 \qquad (11)$$

where $T_2$ is a threshold.

Thresholds $T_1$ and $T_2$ are not fixed. They are adaptively estimated to account for various VOC types and changes in the lighting conditions. An MLE (Maximum Likelihood Estimation) based threshold adaptation scheme has been implemented for this embodiment of the invention, and is similar to a method described in A. Ribeiro and G. B. Giannakis, "Bandwidth-constrained distributed estimation for wireless sensor networks-Part I: Gaussian case," *IEEE Trans. on Signal Processing*, v. 54, pp. 1131-1143, 2006 ("Ribeiro 2006").

The clairvoyant MLE estimator for decision functions $\Delta_1(n)$ and $\Delta_2(n)$, defined in equations (8) and (11), is simply the sample mean estimator. Based on this estimator threshold values $T_1$ and $T_2$ can be easily determined. However the thresholds may not be robust to changing environmental conditions.

Let us consider the problem of estimating a threshold T in an adaptive manner from observed images. We assume that the threshold values vary according to the following expression for each image $$f[n] = T + w[n], n = 0, 1, \ldots, N-1 \qquad (12)$$

where $w[n] \sim N(0, \sigma^2)$ is zero-mean additive white Gaussian noise (AWGN) and n is image frame number.

For each image frame, plume detection functions $\Delta_n$ defines a binary image mask which is determined according to equations (8) and (11). One can also regard a binary mask as indicator variables defined by quantized observations f[n] with respect to the threshold T $$b(n) = 1\{f[n] \in (\tau, +\infty)\} \qquad (13)$$

where $\tau$ is an initial parameter defining the mask b(n).

Each b(n) in equation (14) is a Bernoulli random variable with parameter $$q_k(T) = Pr\{b(n) = 1\} = F(\tau - T) \qquad (14)$$

where $$F(x) = 1/\left(\sqrt{2\pi\sigma}\right) \int_x^{+\infty} \exp[-u^2/2\sigma^2] du \qquad (15)$$

is the complementary cumulative distribution function of w[n]. In this case, the threshold is estimated in N=10 consecutive frames as follows $$T = \tau - F^{-1}\left(\frac{1}{N}\sum_{N=0}^{N-1} b(n)\right),$$

which can be obtained as described in Ribeiro 2006.

In this embodiment of the invention, we have two indicator functions $\Delta_1(n)$ and $\Delta_2(n)$. A more general case can be formulated by defining two non-identical initial parameters for each of the thresholds, $T_1$ and $T_2$. This approach can be summarized in the following three steps:

1—Define a set of initial parameters $\tau = \{\tau_u | u=1, 2\}$
2—Obtain binary observations $b_u$; u=1, 2.
3—Find MLE for T.

Log-likelihood function is given as $$L(T) = \sum_{n=0}^{N-1} b_u(n)\ln(q_u(T)) + (1 - b_u(n))\ln(1 - q_u(T)) \qquad (16)$$

from which the MLE of T can be defined as $$\hat{T} = \arg\max_T \{L(T)\} \qquad (17)$$

Since T in equation (17) cannot be determined in closed-form, Newton's algorithm is utilized based on the following iteration:

$$\hat{T}^{(i+1)} = \hat{T}^{(i)} - \frac{\dot{L}(\hat{T}^{(i)})}{\ddot{L}(\hat{T}^{(i)})} \qquad (18)$$

where $\dot{L}(x)$ and $\ddot{L}(x)$ are the first and second derivatives of the log-likelihood function. Since the MLE problem defined by equations (16) and (17) is convex on T, the MLE in equation (18) is guaranteed to converge to the global optimum of L(T). These steps can be applied for both $T_1$ and $T_2$ separately.

Markov Modeling of Intensity Component Data

In another embodiment, the invention operates by comparing the background image estimated by video data from visible 115 and infrared 110 cameras and the spatial wavelet transform coefficients of the current image frame. Any VOC gases being released right at the instant of leakage have a semi-transparent characteristic. Due to this characteristic, they cause a decrease in sharpness of details inside the background image. The edges inside the background image are comprised by pixels that have high frequencies in this image. So, any decrease in energy of the edges inside this scene may constitute evidence for the presence of VOC gases in the video, provided that the edges do not totally disappear. All these data are used in making a final determination 140 that VOC leakage has been detected.

Figure 2:
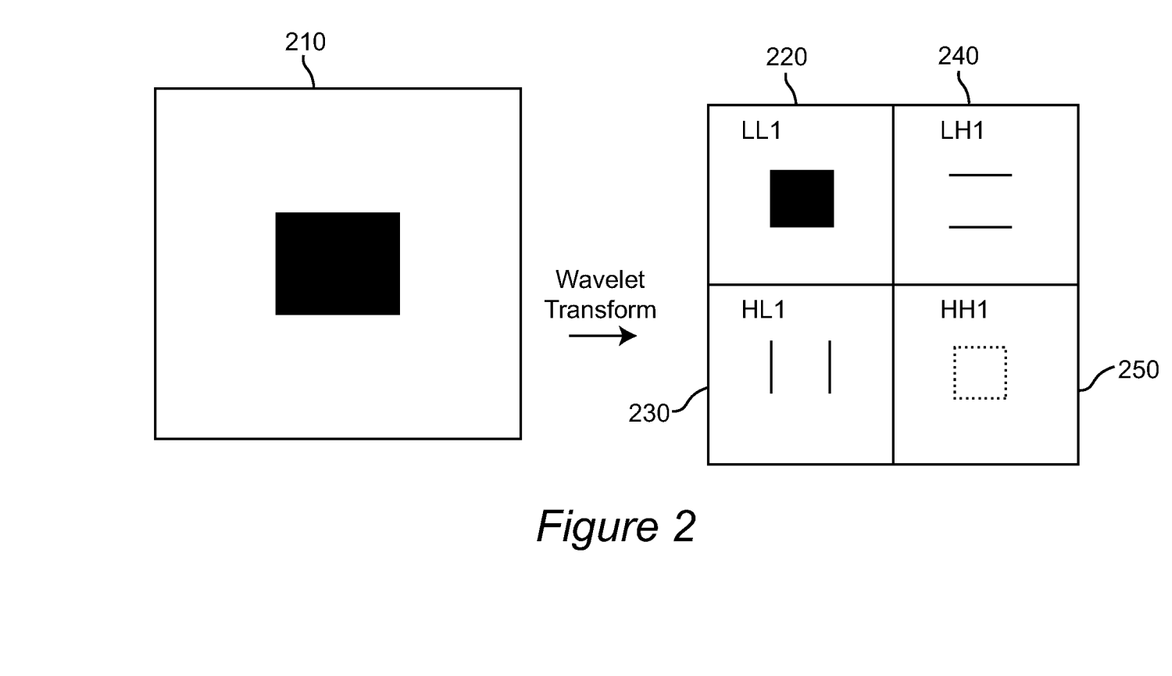
FIG. 2 is a representation of a one-level discrete-time wavelet transform of a two-dimensional image.

Wavelet transform is widely used in analyzing non-stationary signals, including video signals. This transform automatically reveals all extraordinariness of the signal it is applied to. When wavelet transform is applied to two-dimensional images or a video frame, it reveals all boundaries and edges of video objects inside the physical scene represented by the image. Turning now to FIG. 2, a wavelet transform divides an image 210 into various scales of sub-band images. Each sub-band image corresponds to a different frequency subset of the original image 210. Wavelet transforms exploit filter banks in order to process the pixels of picture images and to categorize them as being within low- and high-frequency bands. This process can be successively repeated until a desired level. First sub-band image 220 is called "Low-Low" and shown with LL. This image 220 contains the frequency information corresponding to ($[0<\omega 1<\pi/2$ and $0<\omega 2<\pi/2]$), that is, the low frequency band along both the horizontal and the vertical path of the original picture 210. Similarly, "High-Low" sub-band image (HL) 230 contains high band horizontal and low band vertical frequency information corresponding to ($[0<\omega 2<\pi/2$ and $\pi/2<\omega 1<\pi]$) frequency bands; "Low-High" sub-band image (LH) 240 contains those information corresponding to ($[0<\omega 1<\pi/2$ and $\pi/2<\omega 2<\pi]$), that is, low band horizontal and high band vertical frequency information; and "High-High" sub-band image (HH) 250 corresponding to ([π/2<ω1<π and π/2<ω2<π]), that is, the high frequency band along both the horizontal (ω1) and the vertical (ω2) path.

The level of wavelet transform is identified by the number following this double-letter code. For example, as represented in FIG. 2, the sub-band image identified by LL1 220 corresponds to first level wavelet transform, and specifies the low-low sub-band image obtained by filtering the original images with a low-pass filter followed by horizontal (row-wise) and vertical (column-wise) down-sampling by 2.

Figure 3:
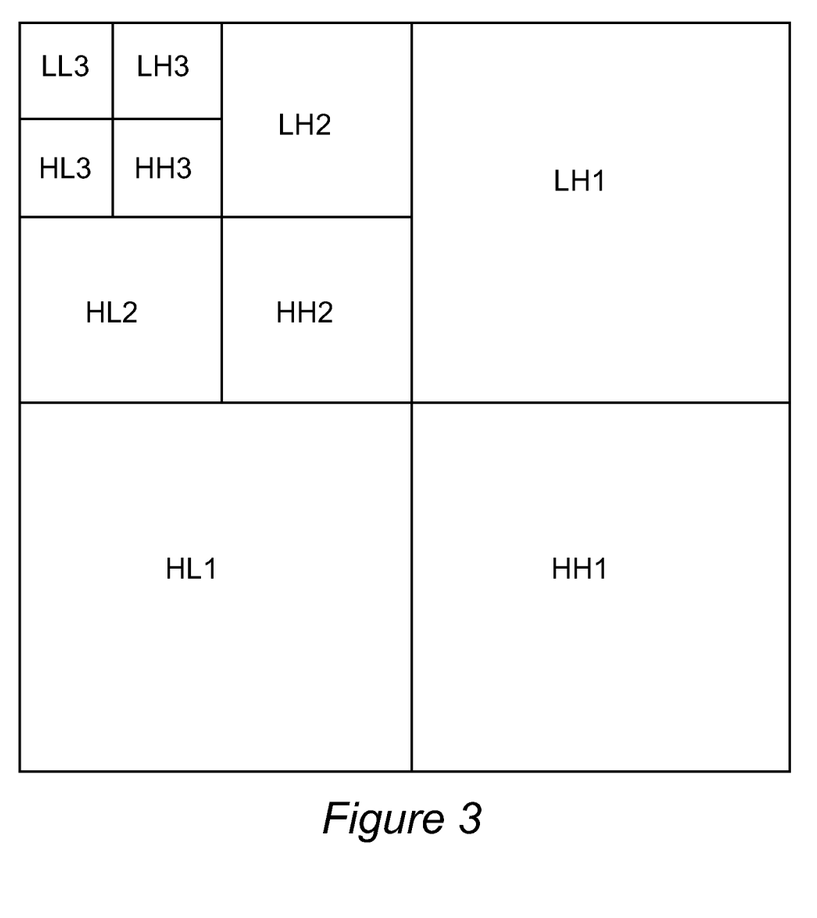
FIG. 3 is a representation of three-level discrete-time wavelet decomposition of the intensity component (I) of a video frame.

Wavelet transforms are generally applied at multiple levels. In this way, the signal, the image or the video frame that will be analyzed is decomposed into different resolution levels corresponding to different frequency bands. For example, third-level discrete wavelet transform of any image, I, is defined as WI={LL3, HH3, HL3, LH3, HH2, HL2, LH2, HH1, HL1, LH1} and is schematically represented by FIG. 3.

In this embodiment of the present invention, firstly the wavelet transform is applied to the black-and-white intensity (I) component of the raw picture data coming from the visible and infrared cameras. Each frame in infrared video signals is generally described by the intensity (I) channel. Then, the third-level wavelet transform is computed for this channel, as represented in FIG. 3.

Since the edge pixels in the scene yield local extrema on the wavelet domain, a decrease occurs at local extrema on the wavelet domain if VOC gases have been released into the scene. Thus a decrease may indicate presence of a VOC plume.

In this embodiment of the present invention, the method explained in *Signal Processing* 2005 was used for extraction of background images from infrared video frames. In accordance with the fundamental assumption taken as the basis for this method, the video data obtained from a stationary camera were used. After moving objects and background image in the infrared video are estimated, it is necessary to determine whether these moving regions correspond to a VOC plume or any other moving object. A volatile organic compound covers the edges in the background image, and causes these locations to appear more misty and hazy. But these edges correspond to local extrema on the wavelet domain. So, considering this fact, this embodiment of the invention identifies as VOC plumes the moving objects that cause a decrease in local extrema. Thus, by using wavelet sub-band images, VOC tracking becomes feasible.

High-frequency energy of a subimage at any level n is kept inside a joint picture $w_n$ created in the following formula:

$$w_n(x,y) = |LH_n(x,y)|^2 + |HL_n(x,y)|^2 + |HH_n(x,y)^2| \quad (19)$$

This picture $w_n$ is divided into blocks of dimensions (K1, K2) to compute the energy e(l1, l2) of each block:

$$e(l1, l2) = \sum_{(x,y)} (w_n(x+l1K1, y+l2K2))^2 \quad (20)$$

Figure 4:
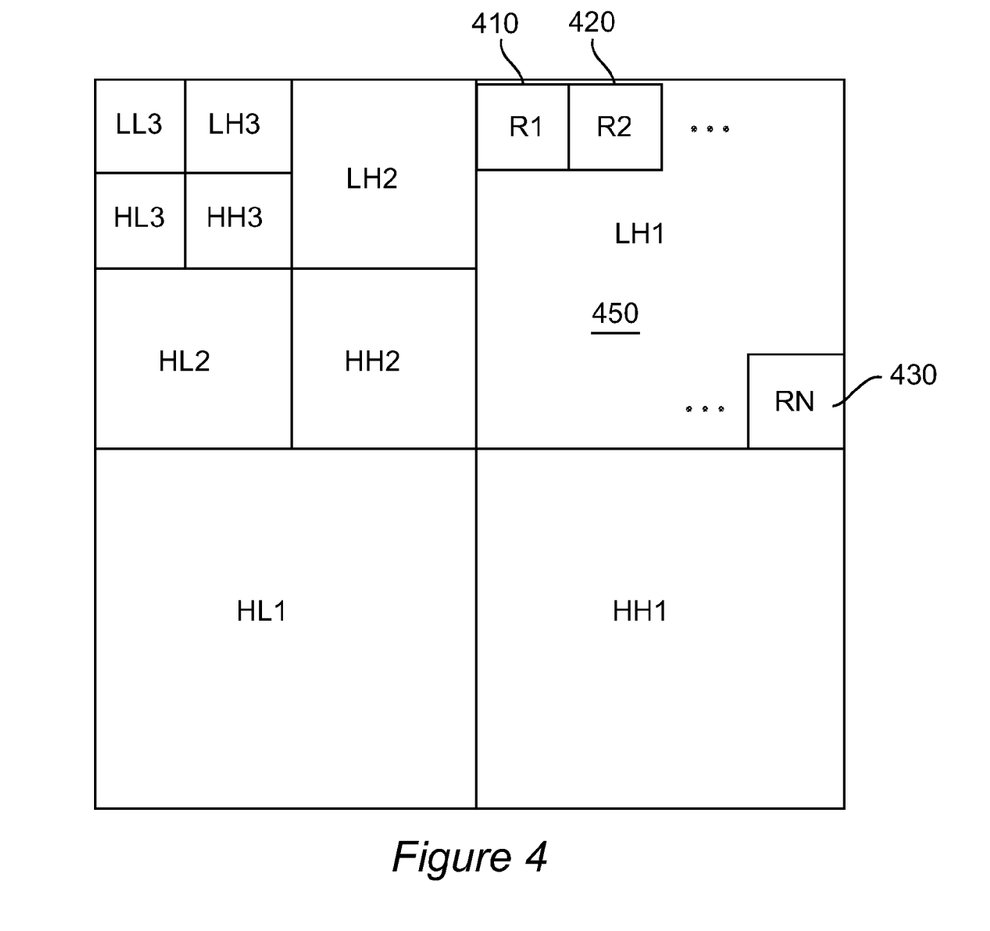
FIG. 4 is a modification of FIG. 3 to show checking of a wavelet transformed sub-band image by dividing the sub-band image LH1 into smaller pieces.

In this equation, $(x,y) \in R_i$, and $R_i$ is the $i^{th}$ block whose dimensions are (K1, K2). FIG. 4 illustrates blocks $R_1, R_2 \ldots$ and $R_N$ ("R1" 410, "R2" 420, and "RN" 430) within the subimage LH1 (item 450). In the preferred implementation of this embodiment of the invention, the size of blocks is specified to be 8×8 pixels. Local extrema of the wavelet transform of the current frame are compared with the highest local coefficient values of the wavelet transform of the background image, and if a decrease is observed in these values inside moving objects, this indicates a possible presence of VOC.

Flickering of volatile organic compounds during leakage from connectors is one of the fundamental features that can be used to separate these materials from ordinary objects in the infrared video. Especially, the pixels within the boundaries of VOC plumes disappear and reappear several times within a second, i.e. the pixels "flicker". The VOC detection system of this embodiment of the present invention is based on determining whether this energy decrease in edges of the infrared images has a periodical and high-frequency characteristic or not. Flickering frequencies of pixels inside these regions are not fixed, and change with time. For this reason, in this embodiment of the present invention, the VOC flickering process is modeled with hidden Markov models.

Figure 5:
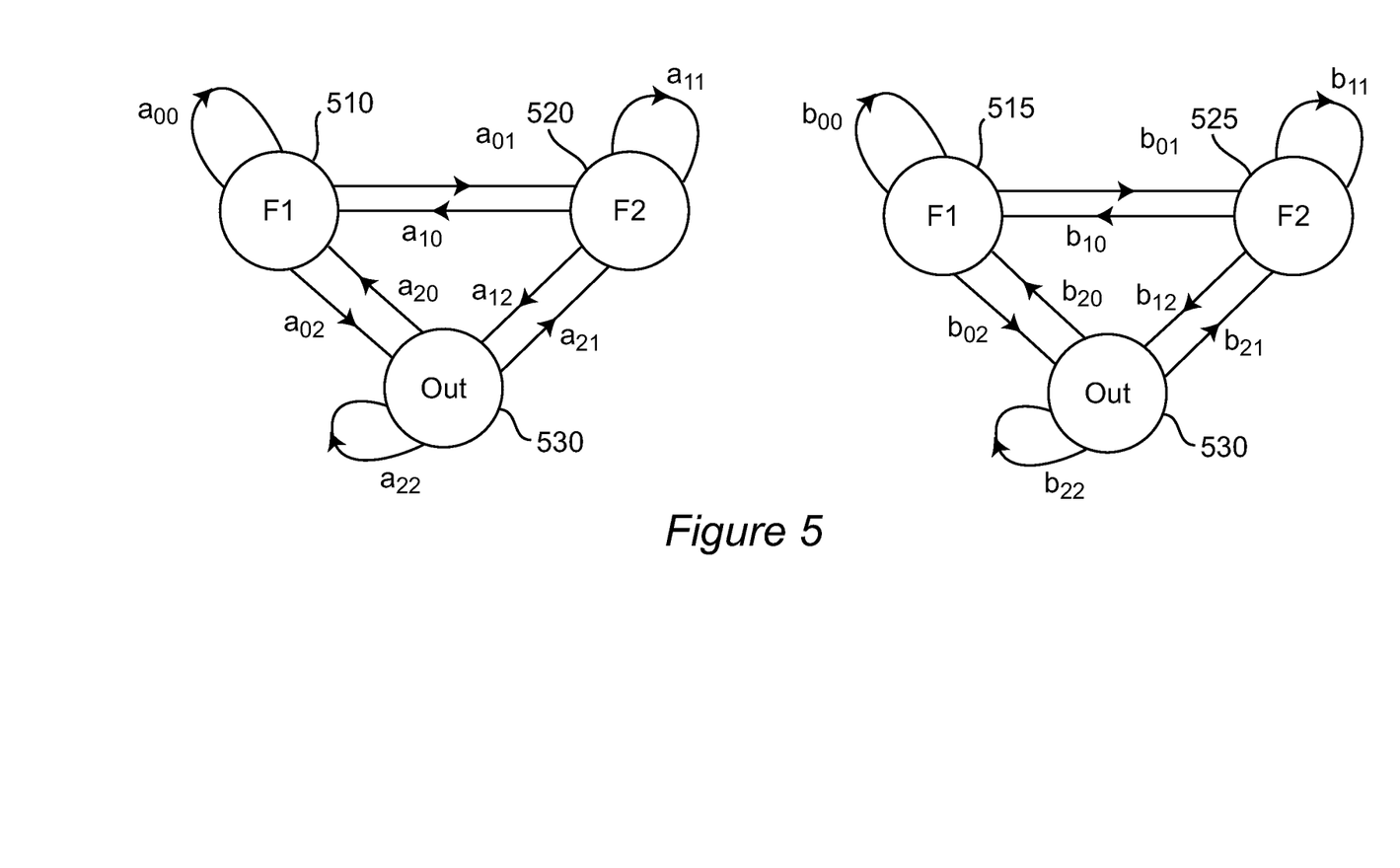
FIG. 5 is a schematic representation of three-state hidden Markov models, for regions with VOC (at left) and regions without VOC (at right).

The first step is to detect energy decreases in low sub-band image edges. This is accomplished by wavelet transform based on equations (19) and (20), thereby identifying those regions with energy decrease. Then, the presence of a VOC plume is determined through three-state hidden Markov models, as represented by the schematic in FIG. 5. Hidden Markov models are trained with a feature signal defined as follows:

Let us use I(n) for the intensity channel value of a pixel inside the $n^{th}$ video frame coming from the visible and the infrared cameras. Now, let us compute the absolute value of wavelet coefficients of the signal defined by I(n), and call it w(n). If we define two threshold values greater than zero, T1<T2, for these positive wavelet coefficients, we can define the states of Markov models by using these threshold values as follows: if w(n)<T1, the model is in "F1" state (510 for VOC, 515 for non-VOC), if T1<w(n)<T2 it is in "F2" state (520 for VOC, 525 for non-VOC), and if w(n)>T2 the model is in "Out" state (530 for VOC, 535 for non-VOC). The system developed with this model analyzes the VOC and non-VOC pixels temporally and spatially. Transition probabilities $a_{ij}$ corresponding to VOC pixel models and $b_{ij}$ corresponding to non-VOC pixel models, are estimated offline by using consecutive video frames. As shown in FIG. 5, the transition is represented from index i to index j, and the "F1", "F2" and "Out" states are represented by the values 0,1,2, respectively, of these indices.

When a device in accordance with this embodiment of the invention is operated in real time by using visible and infrared cameras, the potential VOC plume regions are detected by analyzing the intensity channel in low-low (LL) sub-band images. The state of the Markov model of the pixels in these regions in each video frame is determined as explained in the above paragraph. Former Markov model states for each potential VOC pixel are stored for twenty consecutive video frames. A state sequence probability corresponding to this state history is computed by using probabilities of transition between states of VOC and non-VOC Markov models. The model generating the highest value of the probability is chosen.

Similarly, as regards spatial analysis, the pixels in potential VOC regions are horizontally and vertically scanned by using the same Markov models, and the model generating the highest value of probability is the basis for the determination 140 by the plume detection system whose schematic is shown in FIG. 1.

In a system implementing this embodiment of the invention, wavelet transform analysis was conducted not only along VOC regions, but temporally and spatially inside VOC regions as well. The increase in energies of wavelet transform coefficients indicates an increase in motions with high frequency. For example, motion of an object that leads to an energy decrease in the edges of background image doesn't cause an increase in values of wavelet transform coefficients. This is because no temporal or spatial change occurs in values of pixels corresponding to these objects. However, pixels in actual VOC regions have both temporally and spatially high values of frequency band.

The next step in implementation of this embodiment of the invention is utilization of energy information of wavelet transform coefficients corresponding to potential VOC regions in frames coming from the visible and infrared cameras. For this purpose, contour and center of gravity of the potential VOC region are estimated. Then, the distance between the center of gravity and the contour of the region is computed in the range of $0 \leq \theta < 2\pi$; and in this way a one-dimensional center-contour distance signal is generated. This signal has high frequency for those regions, such as VOC regions, whose contour changes over time; whereas it has low frequency for those regions whose boundaries change slowly over time or don't change at all. We can easily determine the high-frequency component of any spline by using one-level wavelet transform. If we use "$w_{cntr}$" for the wavelet transform coefficients corresponding to one-dimensional center-contour distance signal, and "$c_{cntr}$" for low-band coefficients; the $\rho$ rate, which we call the ratio of wavelet transform energy to low-band energy, will be as follows:

$$\rho = \frac{\sum_n |w_{cntr}(n)|}{\sum_n |c_{cntr}(n)|} \quad (21)$$

This formula can be used to indicate the presence of VOC plume within the field of view of the visible and infrared cameras. The rate $\rho$ for VOC regions is high, whereas it is low for non-VOC regions.

The determinations made in accordance with the various steps explained above are used in making a final decision 140, as shown in FIG. 1. In a practical configuration of the invention there will be multiple sensors 105 (i.e. multiple infrared cameras 110 and multiple visual range cameras 115). Among multiple sensor data collection methods, we note the use of voting, Bayesian extraction and Dampster-Shafer methods. We will concentrate on voting-based decision-fusion methods for the present embodiment. But the other methods may also be used in this embodiment of the invention during the final decision making step 140.

One of the commonly used voting methods, the so-called "m-out-of-n" voting, is based on accepting the output in case m units out of n units of sensors agree with the same output. In another version of this voting, the so-called "T-out-of-v", accepting the decision is based on the following inequality:

$$H = \sum_i w_i v_i > T \quad (22)$$

Here, $w_i$ stands for the weights specified by the user, and $v_i$ stands for the decisions of sensors, and T is a threshold value. Decision parameters of sensors can take binary values such as zero and one.

Experimental Results and Conclusions

The invention can be implemented on a personal computer (PC) with an Intel Core Duo CPU 1.86 GHz processor and tested using videos containing several types of VOC plumes including propane, gasoline and diesel. These video clips also can contain ordinary moving objects like cars, swaying leaves in the wind, etc.

The computational cost of the wavelet transform is low. The filter bank used in the implementation for single level wavelet decomposition of image frames have integer coefficient low and high pass Lagrange filters. Threshold updates are realized using 10 recent frames. Plume detection is achieved in real time. The processing time per frame is less than 15 msec for 320 by 240 pixel frames.

Gasoline has transparent vapor whereas diesel and propane have semi-transparent regular smoke like plumes both in visible band and LWIR (Long Wavelength Infrared) band. That is why it is more reliable to use both a regular camera (115) and an LWIR camera (110) for propane detection. Detection results for fixed and adaptive threshold methods for different VOC types are presented in Table 1, which shows VOC plume detection results for adaptive and non-adaptive threshold implementations. Threshold values are adjusted for gasoline type VOC plumes for the fixed threshold method in Table 1. Therefore, the detection performance for semitransparent VOC plumes is decreased as well as the number of false positives is higher. No false alarms are issued for regular moving regions such as people, cars, etc. when adaptive thresholds are used.

TABLE 1

| VOC Type | Number of Frames with plume | Number of detection frames | | Number of false positives | |
|---|---|---|---|---|---|
| | | Adaptive thresholds | Non-adaptive | Adaptive thresholds | Non-adaptive |
| Gasoline | 1241 | 1120 | 1088 | 0 | 0 |
| Diesel | 443 | 405 | 265 | 0 | 38 |
| Propane | 310 | 288 | 120 | 0 | 14 |

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for determining the presence of volatile organic compounds (VOC) by detecting a drop in temperature at a leakage site, comprising: a computing device, wherein the computing device is configured to:
   detect moving regions in a current video image, wherein the detecting moving regions further comprises subtracting the current video image from an estimated background image;
   and determine that a detected moving regions has decreased wavelet energy by determining an average energy of the detected moving region in the current video image; determining an average energy of a corresponding region in an original image; and determining that the average energy difference is less than a threshold value.

2. A method as in claim 1 wherein the threshold value is adaptively estimated to account for various VOC types and changes in lighting conditions.

3. A method as in claim 1, wherein determining that a detected moving region has decreased wavelet energy further comprises:
   detecting low sub-band image edges using a wavelet transform; using a three-state hidden Markov model to determine flicker for the detected moving region by analyzing an intensity channel in LL sub-band images; and selecting for the detected moving region a model having the highest value of probability of transition between states of VOC and non-VOC Markov models.

4. A method as in claim 3, further comprising:
estimating contour and center of gravity of a detected moving region;
computing a one-dimensional signal for a distance between the contour and center of gravity of the detected moving region; and
determining a wavelet energy based feature of the distance signal.

5. A method as in claim 1, wherein the video image data is captured from stationary visible and infrared cameras, using wavelet analysis comprises transforming the video image data into wavelet domain, and further comprising: determining that a detected moving region is a region containing VOC by combining weighted determinations from respective processing of the video image data from the respective visual and infrared cameras.

6. A method as in claim 5, wherein the weighted determinations are combined using a voting method.

7. A method as in claim 6, wherein the voting method is "T-out-of-v".

8. A system for determining the presence of volatile organic compounds (VOC) by detecting a drop in temperature at a leakage site, comprising: a plurality of imaging devices and one or more computing device, wherein the one or more computing devices are configured to:
detect moving regions in a current video image, wherein the detecting moving regions further comprises subtracting the current video image from an estimated background image;
and determine that a detected moving regions has decreased wavelet energy by determining an average energy of the detected moving region in the current video image; determining an average energy of a corresponding region in an original image; and determining that the average energy difference is less than a threshold value.

9. A system as in claim 8 wherein the threshold value is adaptively estimated to account for various VOC types and changes in lighting conditions.

10. A system as in claim 8, wherein the determining that a detected moving region has decreased wavelet energy further comprises:
detecting low sub-band image edges using a wavelet transform;
using a three-state hidden Markov model to determine flicker for the detected moving region by analyzing an intensity channel in LL sub-band images; and
means for selecting for the detected moving region a model having the highest value of probability of transition between states of VOC and non-VOC Markov models.

11. A system as in claim 10, wherein the one or more computing devices are further configured to:
estimate contour and center of gravity of a detected moving region;
compute a one-dimensional signal for a distance between the contour and center of gravity of the detected moving region; and determining a wavelet energy based feature of the distance signal.

12. A system as in claim 8, wherein the video image data is captured from stationary visible and infrared cameras, using wavelet analysis comprises transforming the video image data into wavelet domain, and further comprising:
determining that a detected moving region is a region containing VOC by combining weighted determinations from respective processing of the video image data from the respective visual and infrared cameras.

13. A system as in claim 12, wherein the weighted determinations are combined using a voting method.

14. A system as in claim 13, wherein the voting method is "T-out-of-v".

* * * * *